United States Patent [19]

Nishimura

[11] Patent Number: 4,793,453
[45] Date of Patent: * Dec. 27, 1988

[54] ELECTROMAGNETICALLY CONTROLLED SPRING CLUTCH MECHANISM

[75] Inventor: Kozo Nishimura, Akashi, Japan

[73] Assignee: Mita Industrial Co., Ltd., Osaka, Japan

[ * ] Notice: The portion of the term of this patent subsequent to Nov. 3, 2004 has been disclaimed.

[21] Appl. No.: 25,763

[22] Filed: Mar. 13, 1987

Related U.S. Application Data

[63] Continuation-in-part of Ser. No. 847,079, Apr. 1, 1986, Pat. No. 4,704,554.

[30] Foreign Application Priority Data

Mar. 31, 1986 [JP] Japan .................................. 61-71024

[51] Int. Cl.[4] ...................... F16D 13/02; F16D 13/08; F16D 27/10
[52] U.S. Cl. .................................. 192/26; 192/81 C; 192/84 T
[58] Field of Search .................... 192/84 T, 81 C, 90, 192/35, 26, 33 C, 84 C

[56] References Cited

U.S. PATENT DOCUMENTS

| | | | |
|---|---|---|---|
| 2,493,721 | 1/1950 | Brie | 172/284 |
| 3,905,458 | 9/1975 | Mehrbrodt | 192/26 |
| 4,126,215 | 11/1978 | Puro | 192/84 C |
| 4,227,600 | 10/1980 | Shirai | 192/84 C |
| 4,314,220 | 2/1982 | Ito et al. | 336/65 |
| 4,321,992 | 3/1982 | Gallo | 192/81 C |
| 4,386,288 | 5/1983 | Laurie | 310/49 R |
| 4,502,578 | 3/1985 | Koyama | 192/26 |
| 4,523,117 | 6/1985 | Daniels | 310/71 |
| 4,570,768 | 2/1986 | Nishimura et al. | 192/35 |
| 4,704,554 | 11/1987 | Nishimura | 192/81 C X |

FOREIGN PATENT DOCUMENTS

2013795 8/1979 United Kingdom .

OTHER PUBLICATIONS

European Search Report and annex thereto in corresponding application EP 87 30 2359.

*Primary Examiner*—Rodney H. Bonck
*Attorney, Agent, or Firm*—Beveridge, DeGrandi & Weilacher

[57] ABSTRACT

An electromagnetically controlled spring clutch mechanism comprising an output rotating element, an input rotating element, a first boss member rotating as a unit with the input rotating element, a second boss member rotating as a unit with the output rotating element, a coil spring means fitted over and across the first and second boss members, a rotation control member for hampering the contraction of the coil spring, a movably mounted armature, a biasing device for biasing the armature toward the rotation control member, and an electromagnetic device for magnetically attracting the armature. When the electromagnetic device is deenergized, the armature acts on the rotation control member by the action of the biasing device whereby the contraction of the coil spring is hampered. When the electromagnetic device is energized, the armature is moved away from the rotation control member by the magnetic attracting force of the electromagnetic device whereby the coil spring is contracted.

5 Claims, 3 Drawing Sheets

ELECTROMAGNETICALLY CONTROLLED SPRING CLUTCH MECHANISM

REFERENCE TO RELATED APPLICATION

This is a continuation-in-part of U.S. patent application Ser. No. 847,079, filed Apr. 1, 1986, now U.S. Pat. No. 4,704,554.

BACKGROUND OF THE INVENTION

1. Field of the Invention

This invention relates to an electromagnetically controlled spring clutch mechanism for transmitting a driving force by utilizing contraction of a coil spring means.

2. Description of the Prior Art

Electromagnetically controlled spring clutch mechanisms utilizing a coil spring means have previously been used widely to transmit selectively the driving force of an input rotating element being driven. One example of clutch mechanisms of this type is disclosed in U.S. Pat. No. 4,570,768. The present applicants proposed an improvement of the known clutch mechanism and disclosed it in the specification and drawings of U.S. Pat. No. 4,704,554 (entitled: ELECTROMAGNETICALLY CONTROLLED SPRING CLUTCH MECHANISM). The improved electromagnetically controlled spring clutch mechanism comprises an output rotating element mounted rotatably, an input rotating element mounted on the output rotating element, a rotor adapted to rotate as a unit with the output rotating element, an armature positioned opposite to one side surface of the rotor, a rotating supporting member mounted rotatably on the output rotating element, a biasing spring member interposed between the armature and the rotating supporting member for elastically biasing the armature away from said one side surface of the rotor, an electromagnetic means for magnetically attracting the armature to said one side surface of the rotor against the elastic biasing action of the biasing spring member, a first boss member adapted to rotate as a unit with the input rotating element, a second boss member adapted to rotate as a unit with the output rotating element, and a coil spring means fitted over and across the first and second boss members with one end being connected to the input rotating element and the other end being connected to the rotating supporting member. When the electromagnetic means is energized, the armature is attracted to said one side surface of the rotor by the electromagnetic attracting force of the electromagnetic means. This produces a difference in speed between the input rotating element and the rotating supporting member, and the coil spring means is contracted. As a result, the first boss member and the second boss member are drivingly connected via the coil spring member. On the other hand, when the electromagnetic means is deenergized, the armature is moved away from the one side surface of the rotor by the elastic biasing action of the biasing spring member, whereby the contraction of the coil spring means is cancelled. This results in releasing of the driving connection of the first and second boss members via the coil spring means.

The aforesaid electromagnetically controlled spring clutch mechanism has such a structure that while the electromagnetic means is energized, the driving connection is achieved and the driving force is transmitted. It is difficult therefore to control the mechanism accurately so that the output rotating element is rotated through a predetermined angle. To rotate the output rotating element through a predetermined angle, for example through 180°, it is proper in principle to deenergize the electromagnetic means when the output rotating element has rotated through the predetermined angle (e.g., 180°). It is difficult, however, to rotate the output rotating element accurately through the predetermined angle owing to the difficulty of accurately detecting the rotating angle of the output rotating element, and to the response characteristics of the clutch itself. There exists a spring clutch mechanism in which the output rotating element is rotated through a predetermined angle. Such a spring clutch mechanism is composed of a spring clutch means and an actuation controlling means annexed to the spring clutch means. The spring clutch means has an output rotating element mounted rotatably, an input rotating element mounted rotatably on the output rotating element, a first boss member adapted to rotate as a unit with the input rotating element, a second boss member adapted to rotate as a unit with the output rotating element, a coil spring means fitted over and across the first and second boss members, and a ratchet having a pawl portion and fitted over, and rotatably mounted on, the coil spring means, one end of the coil spring means being connected to the ratchet and its other end being connected to the second boss member. The actuation control means has an actuation control member having an engaging pawl engageable with the pawl portion of the ratchet, and an actuation means, such as an electromagnetic solenoid, for actuating the actuation control member. When in this spring clutch mechanism, the actuating means is in the deenergized state, the engaging pawl of the actuation control member is in engagement with the pawl portion of the ratchet, the rotation of the ratchet incident to the rotation of the input rotating element is accurately hampered and the contraction of the coil spring means is hampered. As a result, the first and second boss members are not drivingly connected through the coil spring means. On the other hand, when the actuating means is energized and the engaging pawl is disengaged from the pawl portion of the ratchet, the ratchet is rotated incident to the rotation of the input rotating element whereby the coil spring means is contracted. As a result, the first and second boss are drivingly connected via the coil spring means as is required.

The spring clutch mechanism of the described construction, however, requires a space for installing the actuation control means together with the spring clutch means. It further has the disadvantage that it is difficult, and time-consuming, to prescribe the relative positions of the spring clutch means and the actuation control means, particularly the relative positions of the pawl portion of the ratchet and the engaging pawl of the actuation control means.

SUMMARY OF THE INVENTION

It is a primary object of this invention to overcome the aforesaid problems of the prior art, and to provide an excellent electromagnetically controlled spring clutch mechanism in which the rotation of an output rotating element can be controlled by a relatively simple construction.

According to this invention, there is provided an electromagnetically controlled spring clutch mechanism comprising an output rotating element mounted rotatably, an input rotating element mounted on the output rotating element for free rotation relative to the output rotating element, a first boss member adapted to rotate as a unit with the input rotating element, a second boss member provided adjacent to the first boss member and adapted to rotate as a unit with the output rotating element, a coil spring means fitted over and across the first and second boss members and drivingly connecting said two boss members by its contraction, a rotation control member for hampering the contraction of the coil spring means, an armature mounted in proximity to the rotation control member for free rotation axially of the output rotating element, a biasing means for biasing the armature in a direction in which the armature approaches the rotation control member, and an electromagnetic means for magnetically attracting the armature away from the rotation control member against the biasing action of the biasing means wherein when the electromagnetic means is deenergized, the armature is biased toward the rotation control member by the action of the biasing means and the rotation of the rotation control member is hampered whereby the contraction of the coil spring means is hampered, and when the electromagnetic means is energized, the armature is magnetically attracted in a direction away from the rotation control member by the action of the electromagnetic means and the rotation control member is free to rotate whereby the coil spring means is contracted.

DETAILED DESCRIPTION OF THE PREFERRED EMBODIMENTS

With reference to the accompanying drawings, one embodiment of the electromagnetically controlled spring clutch mechanism of the invention will be described in detail. In the following embodiment, the electromagnetically controlled spring clutch mechanism will be described as it is applied to a conveyor roller for conveying a copying paper sheet in an electrostatic copying apparatus. It should be understood, however, that the invention is not limited to this embodiment, and the clutch mechanism of the invention may be applied to various other devices.

Figure 1:
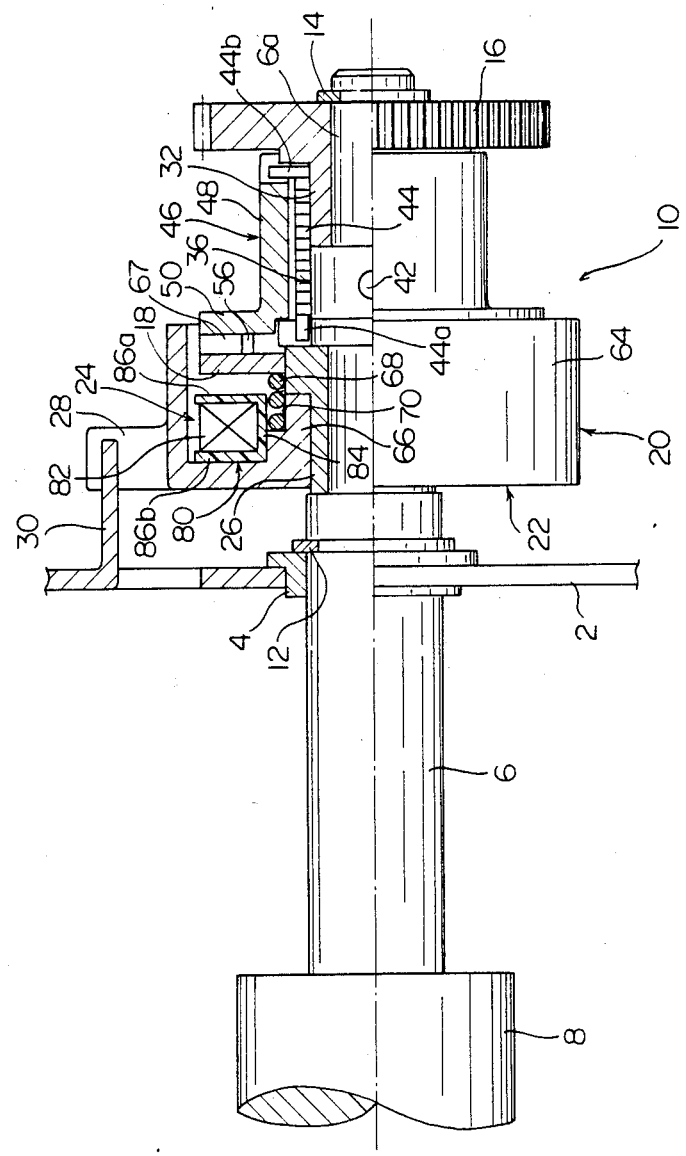
FIG. 1 is a partial sectional view showing one embodiment of the electromagnetically controlled spring clutch mechanism constructed in accordance with this invention as to a convey or roller.

In FIG. 1 showing the electromagnetically controlled spring clutch mechanism as it is applied to conveyor rollers, a pair of vertical base plates (for example, vertical base plates of an electrostatic copying apparatus) are disposed in spaced-apart relationship in the left-right direction in FIG. 1, and a supporting shaft 6 (constituting an output rotating element) is rotatably mounted via bearing members 4 between the pair of vertical base plates 2 (in FIG. 1, only one side portion of the shaft 6, one of the vertical base plates 2 and one of the bearing members 4 are shown). A conveyor roller 8 is mounted on the intermediate portion of the supporting shaft 6. The supporting shaft 6 extend to the right in FIG. 1 from its one end to the other end. The other end portion projects outwardly through the base plate 2, and an electromagnetically controlled spring clutch mechanism in accordance with this invention shown generally at 10 is provided in the projecting end portion of the shaft 6. Stop members 12 and 14 are provided in the projecting end portion. Accordingly, when the clutch mechanism 10 is in connection, the driving force from a driving source (not shown) is transmitted to the supporting shaft 6 via the clutch mechanism 10, and the conveyor roller 8 is rotated as a unit with the supporting shaft 6.

Figure 2:
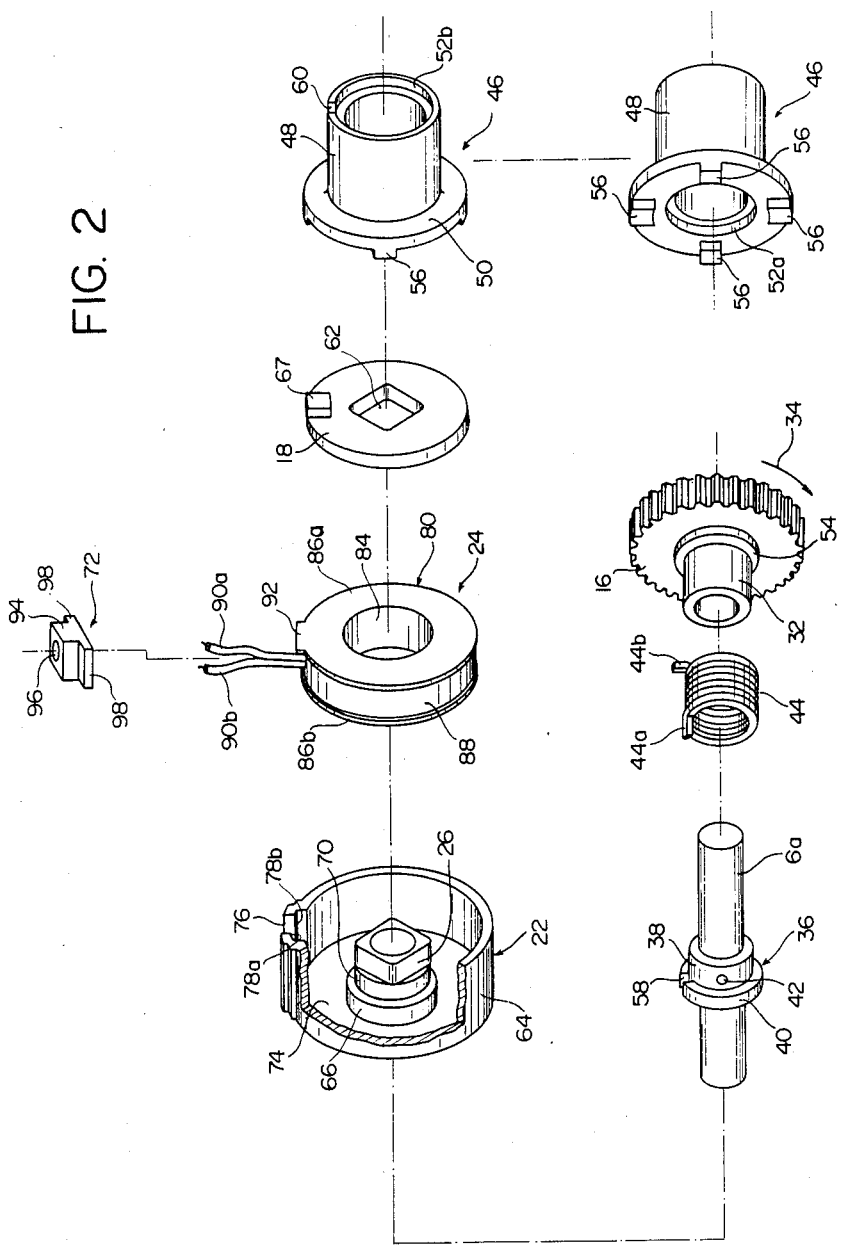
FIG. 2 is an exploded perspective view showing the electromagnetically controlled spring clutch mechanism of FIG. 1.

With reference to FIG. 2 as well as FIG. 1, the illustrated electromagnetically controlled spring clutch mechanism 10 includes a gear 16 constituting an input rotating element, an armature 18 and an electromagnetic means 20. The electromagnetic means 20 is disposed in one end portion of the small-diameter portion 6a of the supporting shaft 6, i.e. that end portion of the supporting shaft 6 which is on the side of the base plate 2, and has a cylindrical field 22 and a coil assembly 24 fitted in the field 22. The field 22 is rotatably mounted on the small-diameter portion 6a via a sleeve member 26. A projecting portion 28 is provided as a unit in the field 22, and an engaging depressed portion is formed in the projecting portion 28. An engaging protrusion 30 is provided in the base plate 2 by bending part of the base plate 2 outwardly. The engaging protrusion 30 is received in the engaging depressed portion formed in the projecting portion 28 (see FIG. 1). It will be easily understood, that the electromagnetic means 20 is substantially kept therefore, from rotation, and the supporting shaft 6 is rotated relative to the electromagnetic means 20. The electromagnetic means 20 will be described in detail hereinafter.

The gear 16 provided in the other end portion (i.e., the outside end portion) of the small-diameter portion 6a is rotatable relative to the small-diameter portion 6a. In the embodiment shown, a first cylindrical boss member 32 is provided as a unit on one surface (the left surface in FIGS. 1 and 2) of the gear 16, and adapted to rotate as a unit with the gear 16. The first boss member 32 extends to the left in FIGS. 1 and 2 toward a second boss member to be described. The first boss member 32 may alternatively be formed as a separate member from the gear 16 and fixed to the one surface of the gear 16 by a bolt or the like. The gear 16 is drivingly connected to a driving source (not shown) such as an electric motor via a suitable gear mechanism or the like (not shown) and rotated in a direction shown by an arrow 34 (FIG. 2) by the driving source. The stop member 14 engages the outside end of the small-diameter portion 6a (outwardly of the site of mounting the gear 16) to prevent disengagement of the gear 16 from the small-diameter portion 6a (FIG. 1).

second boss member 36 is provided adjacent to the first boss member 32 provided on the gear 16. The second boss member 36 has a cylindrical boss portion 38 and an annular flange portion 40 provided on one end (the left end in FIGS. 1 and 2) of the boss portion 38. The second boss member 36 is mounted on the small-diameter portion 6a so as to rotate as a unit with it by fitting a pin member 42 in a pair of pin holes formed in the boss portion 38 and a through-hole formed in the small-diameter portion 6a. If desired, the second boss member 36 may be formed integrally in the shaft member 6.

A coil spring means 44 is fitted over and across the first boss member 32 and the boss portion 38 of the second boss member 36. The boss portion 38 of the second boss member 36 extends to the right in FIGS. 1 and 2 toward the first boss member 32, and the facing end surfaces of the two boss members are kept in contact, or proximity, with each other. The outside diameter of the boss portion 38 of the second boss member 36 is substantially equal to the outside diameter of the first boss member 32, and the coil spring means 44 is fitted over and across the first boss member 32 and the boss portion 38 of the second boss member 36. A rotation control member 46 is rotatably mounted over the coil spring means 44. The rotation control member 46 has a hollow sleeve portion 48 and an annular flange portion 50 provided on the peripheral surface of one end of the hollow sleeve portion 48. Enlarged-diameter portions 52a and 52b having slightly increased inside diameter are provided on the inner circumferential surfaces of both ends of the hollow sleeve portion 48. One enlarged diameter portion 52a (the left enlarged diameter portion in FIGS. 1 and 2) is rotatably supported on the annular flange portion 40 of the second boss member 36. The other enlarged-diameter portion 52b (the right enlarged-diameter portion in FIGS. 1 and 2) is rotatably supported on an annular projecting portion 54 provided on the aforesaid one surface of the gear 16 (see FIG. 1). Second pawl members 56 engageable with a first pawl member 67 provided in the armature 18 are further provided in the left end surface in FIGS. 1 and 2 of the annular flange 50 of the rotation control member 46 so mounted. In the embodiment shown, there are four second pawl members 56 provided on the left end surface of the annular flange 50 at substantially equal intervals in the circumferential direction, and formed integrally with the annular flange 50. The second pawl members 56 project to the left in the axial direction of the supporting shaft 6 in FIGS. 1 and 2, namely toward the armature 18. In relation to the rotation control member 46, one end 44a of the coil spring means 44 is engaged with a recess 58 formed in the annular flange portion 40 of the second boss member 36, and its other end 44b is engaged with a recess 60 formed in the other end portion of the sleeve portion 48 of the rotation control member 46. The coil spring means 44 coils right-handedly as viewd from left in FIGS. 1 and 2 from its one end 44a to its other end 44b (namely in a direction in which the coil spring means 44 is contracted when the rotation control member 46 is rotated incident to the rotation of the gear 16 in the direction of arrow 34).

The armature 18 is disposed between the electromagnetic means 20 and the rotation control member 46. The armature 18 may be formed of a magnetic material. It is constructed of a disc-like member having a rectangular opening 62 in its central portion. The armature 18 is mounted movably in the axial direction of the small-diameter portion 6a, or in other words in a direction in which it moves toward and away from the rotation control member 46. In the embodiment shown, the armature 18 is disposed within an outside wall 64 of the field 22 of the electromagnetic means 20 and mounted on the sleeve 26. The field 22 has the cylindrical outside wall 64 and an inside wall 66 disposed inwardly thereof, and the sleeve member 26 is fixed to the inside wall 66. The sleeve member 26 projects to the right in FIGS. 1 and 2 from one end (the right end in FIGS. 1 and 2) of the inside wall 66. The outside shape of the projecting end portion (constituting a supporting projecting portion) is nearly rectangular corresponding to the opening 62 formed in the armature 18. The armature 18 is mounted on the projecting end portion of the sleeve member 26. Accordingly, since the electromagnetic means 20 is not rotated, the armature 18 is not substantially rotated. Instead, the small-diameter portion 6a of the shaft 6 is rotated relative to the armature 18. On the other hand, the movement of the armature 18 in the axial direction of the sleeve member 26 is permitted, and the armature 18 is free to move axially of the sleeve member 26. In the embodiment shown, the armature 18 is allowed to move freely by forming the projecting end portion of the sleeve member 26 in a nearly rectangular shape and forming the nearly rectangular opening 62 in the armature 18. Alternatively, the armature 18 can be made free to move axially of the small-diameter portion 6a by providing a rotation-hampering receiving portion in the outside wall 64 of the field 22, and providing projecting portion receivable freely in the rotation-hampering receiving portion on the peripheral edge portion of the armature 18. The first pawl member 67 engageable with the second pawl member 56 is provided in one surface (the right surface in FIGS. 1 and 2) of the armature 18. In the embodiment shown, one first pawl member 67 is formed as an integral unit with the armature 18, and projects to the right in the axial direction of the supporting shaft 6 in FIGS. 1 and 2, namely toward the annular flange portion 50 of the rotation control member 46.

A biasing means (not shown in FIG. 2) is interposed between the electromagnetic means 20 and the armature 18. In the embodiment shown, the biasing means is constructed of an elastic biasing spring member 68, and interposed between the bottom surface of a spring receiving recess 70 defined in the inside wall 66 of the field 22 and the armature 18 extending over a part of the inside wall 66 and a part of the projecting end portion of the sleeve member 26. The elastic biasing spring member 68 acts on the armature 18 to bias it elastically to the right in FIG. 1, namely toward the annular flange portion 50 of the rotation control member 46.

Now, with reference to FIG. 2, the electromagnetic means 20 will be described in detail. The illustrated electromagnetic means 20 comprises the cylindrical field 22, the coil assembly 24 and a protective member 72. The field 22 has a nearly circular end wall 74, and a circular opening is formed in the central part of the end wall 74. The cylindrical outside wall 64 and the cylindrical inside wall 66 extending to one side (to the right in FIGS. 1 and 2) are provided on the outer circumferential edge portion and inner circumferential edge portion of the end wall 74, and one end surface of the field 22 is opened. In the illustrated embodiment, the outside wall 64 projects toward the aforesaid one side beyond one end of the inside wall 66. In the field 22, a mounting opening 76 opened to the above one end surface of the field 22 is provided in the outside wall 64. The mounting opening 76 is substantially rectangular and extends from the opening exsisting in one end surface of the field 22 toward its other end as far as it reaches the inside surface of the end wall 74. In the illustrated field 22, shoulder portions 78a and 78b are provided in those opposing site of the outside wall 64 which define the side surfaces of the mounting openine 76. The shoulder portions 78a and 78b extend from one end of the outside wall 64 of the field 22 toward the other end portion in the mounting direction of the protective member 72. The sleeve member 26 is mounted on the inner surface of the inside wall 66 by forcing it into the inner surface. As shown in FIG. 2, the sleeve member 26 slightly projects to the aforesaid one side beyond one end of the inside wall 66. The projecting end portion of the sleeve member 26 has a nearly rectangular outside shape, and as stated hereinabove, the armature 18 is movably mounted on it. Alternatively, it is possible to form one end portion of the inside wall 66 in a nearly rectangular outside shape and mount the armature 18 movably on this portion. One end portion of the outside wall 64, on the other hand, slightly projects toward the aforesaid one side beyond one end of the sleeve member 26. A stepped portion defining the spring receiving recess 70 is formed on the periphery of one end portion of the inside wall 66 of the field 22. It will be easily understood from FIG. 2 that the field 22 of this construction can be easily formed as one-piece unit by sintering. By forcing the sleeve member 26 into the inside wall 66 of the field 22 formed by sintering from the aforesaid one end surface side, they are assembled in the form shown in FIG. 2.

The coil assembly 24 includes a bobbin 80 and a coil 82 wound on the bobbin 80. With reference also to FIG. 1, the illustrated bobbin 80 has a hollow sleeve portion 84 and an annular flange portions 86a and 86b provided at both ends of the sleeve portion 84. In the illustrated embodiment, the bobbin 80 is formed as a one-piece unit from a synthetic resin or a ceramic material. As shown in FIG. 1, the coil 82 is wound on the peripheral surface of the sleeve portion 84 of the bobbin 80 and positioned between the flange portions 86a and 86b. In the illustrated embodiment, as shown in FIG. 2, the coil 82 wound on the bobbin 80 is further covered with a tapelike seal member 88 and is led outwardly from the seal member 84 only at both end portions thereof. Lead wires 90a and 90b constituting a connecting wire portion are connected to the both end portions. By connecting the lead wires 90a and 90b in this manner, the coil assembly 24 is assembled in the form shown in FIG. 2. In the coil assembly 24 described above, a position setting projection 92 projecting radially outwardly is preferably provided in at least one peripheral edge portion of the flange portions 86a and 86b. More preferably, the position setting projection 92 is provided in the flange portion 86a as shown in the illustrated embodiment.

The projective member 72 further has a main body portion 94. In the illustrated embodiment, the main body portion 94 has a rectangular cross-sectional surface, and a through-hole 96 extending axially is formed in the central part of the main body portion 94. An outwardly projecting engaging protrusion 98 is provided each in two opposing surfaces of one end portion of the main body portion 94. The protective member 72 of this construction can be formed as a one-piece unit by, for example, molding a synthetic resin or a ceramic material.

The electromagnetic means 20 can be built in the form shown in FIG. 1 by assembling the field 22, the coil assembly 24 and the protective member 72 by the following procedure.

First, a vinyl-jacketed electric wire is cut to a predetermined length to form a pair of lead wires 90a and 90b. Connection terminals (not shown) are connected under pressure to the lead wires 90a and 90b at one end, and the other end portions of the lead wires 90a and 90b are connected to the opposite ends of the coil 82 wound on the bobbin 80. Thus, the coil assembly 24 in the form shown in FIG. 2 is built.

The lead wires 90a and 90b (constituting the connecting wire portion of the coil 82) connected to the coil 82 are then inserted into the through-hole formed in the protective member 72, and the protective member 72 is positioned at the other end portions of the lead wires 90a and 90b.

Then the protective member 72 is fitted in the fixing opening 76 formed in the outside wall 64 of the field 22, and the coil assembly 24 is mounted in place between the outside wall 64 and the inside wall 66 of the field 22. At the time of mounting, in the protective member 72, the main body portion 94 of the protective member 72 is kept in alignment with the fixing opening 76 formed in the field (the opening existing at the aforesaid one end surface of the field 22) on the aforesaid one end surface side of the field 22, and the engaging protrusion 98 is kept in alignment with the shoulder portions 78a and 78b of the field 22. On the other hand, in the coil assembly 24, the bobbin 80 is positioned between the outside wall 64 and the inside wall 66 of the field 22, and the position setting protrusion 92 provided in the bobbin 80 is positioned between the shoulder portions 78a and 78b of the field 22, on the side of the aforesaid one end surface of the field 22. The protective member 72 is inserted into the mounting opening 76 through the aforesaid opening in its mounting direction, namely to the left in FIG. 2, and at the same time, the bobbin 80 is inserted between the outside wall 64 and the inside wall 66 of the field 22 in its mounting direction, namely to the left in FIG. 2, through the aforesaid one open end surface and fixed there. Fixing of the bobbin 80 to the field 22 is preferably effected by providing a fixing protrusion (not shown) slightly projecting radially outwardly in the outside surface of the inside wall 66 of the field 22, for example, (that surface which faces the outside wall 64), and forcing the bobbin 80 onto the inside wall 66 having the fixing protrusion formed therein. This permits easy fixation of the bobbin 80 without the need for a tool exclusively used for it. Preferably, the fixing protrusion (not shown) has such a shape that the amount of its outward projection in the radial direction increases progressively in the mounting direction of the bobbin 80. The fixing protrusion may alternatively be provided on the inner circumferential surface of the sleeve portion 84 of the bobbin 80. When the coil assembly 24 is mounted as described above, the electromagnetic means 20 is assembled as shown in FIG. 1. Specifically, the main body portion 94 of the protective member 72 is positioned within the mounting opening 76 of the field 22 and projects outwardly of the outside wall 64 through the opening 76, and the lead wires 90a and 90b are prevented accurately from making direct contact with the edge portion defining the mounting opening 76. Furthermore, the radically outward movement of the protective member 72 relative to the field 22 is hampered by its engaging projection 98 abutting against the shoulder portions 78a and 78b of the field 22. This also permits accurate prevention of slipping of the protective member 72 from the mounting opening 76. In this assembled state, the position setting protrusion 92 provided in the flange portion 86a of the bobbin 80 is positioned across the shoulder portions 78a and 78b on the aforesaid one end surface side of the protective member 72. Hence, the slipping of the protective member 72 from the mounting opening 76 is also accurately prevented. When the position setting projection 92 is provided in the flange portion 86a situated on the side of the aforesaid one end surface of the field 22, it serves not only to perform position setting in the mounting of the bobbin 80, more specifically to hamper the rotation of the bobbin 80 relative to the field 22 by being situated over and across the shoulder portions 78a and 78b and to position the other end portions of the lead wires 90a and 90b at the mounting opening 76, and also to prevent slipping of the protective member 72 from the mounting opening 76. When the position setting protrusion 92 is provided in the flange portion 86b located on the other end side of the field 22, it performs only the position setting action at the time of mounting the bobbin 80.

In the electromagnetic means 20 of the above-described construction, the protective member 72 as connected to the lead wires 90a and 90b of the coil 82 can be mounted in place on the field 22 through the mounting opening 76 formed in the field 22. Accordingly, the step of leading out the connecting wire portion (in the prior art, a hole is formed in the outside wall of the field and the connecting wire portion is led to the outside through the hole) and the step of forcibly inserting the protective member (in the prior art, the protective member fitted to the connecting wire portion is forced into the hole formed in the outside wall of the field) can be omitted, and the assembling can be done easily and simply, and may be automated.

The assembling of the electromagnetic means 20 is substantially the same as that disclosed in the specification and drawings of Japanese Utility Model Application No. 30129/1986 (entitled: ELECTROMAGNETIC CLUTCH) filed on Mar. 4, 1986 by the present applicant. For details, reference may be made to the specification and drawings of the above Japanese Utility Model Application No. 30129/1986.

In the electromagnetically controlled spring clutch mechanism 10 described above, the electromagnetic means 20, the elastic biasing spring member 68, the armature 18, the second boss member 36, the first boss member 32 and the gear 16 are arranged in this sequence from one end to the other end of the small-diameter portion 6a of the shaft 6, and the coil spring member 44 is provided over and across the second boss member 36 and the first boss member 32, and the rotation control member 46 is provided over the coil spring member 44. The rotation control member 46 is positioned on the side (right side in FIG. 1) of the armature 18, and the electromagnetic means 20 is positioned on the other surface side thereof. The elastic biasing spring member 68 interposed between the electromagnetic means 20 and the armature 18 acts on the armature 18 and biases it elastically toward the rotation control member 46 to the right in FIG. 1.

When the electromagnetic means 20 is deenergized in the electromagnetically controlled spring clutch mechanism 10, the end surface of the first pawl member 67 provided on the aforesaid one surface of the armature 18 is caused to abut against that surface of the annular flange portion 50 of the rotation control member 46 which faces the aforesaid one surface of the armature 18 by the action of the elastic biasing spring member 68, and at the same time, the end surface of each of the second pawl members 56 provided on the aforesaid facing surface of the annular flange portion 50 is caused to abut against the aforesaid one surface of the armature 18, both by the action of the elastic biasing spring member 68. Consequently, the first pawl member 67 of the armature 18 becomes engageable with the second pawl members 56 formed in the annular flange portion 50 of the rotation control member 46. When two or more pawl members are formed in the armature 18 or the rotation control member 46, the preferred construction is such that the end surfaces of the pawl members abut against the facing surfaces of the other pawl members as shown in the illustrated embodiments.

When the first pawl member 67 engages the second pawl member 56 (any one of the four second pawl members 56), the rotation of the rotation control member 46 in a given direction can be accurately hampered because the rotation of the armature 18 is restrained. Thus, when the gear 16 is rotated in the direction of arrow 34 (FIG. 2) in the state of FIG. 1 in which the first pawl member 67 engages the second pawl member 56, the coil spring 44 is not contracted by the rotation of the gear 16 and the rotating force of the gear 16 is not transmitted to the supporting shaft 10 because the rotation of the rotation control member 46 is hampered.

Figure 3:
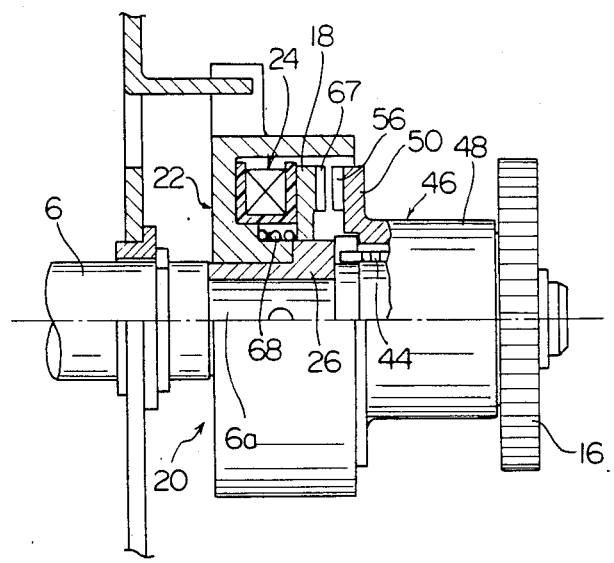
FIG. 3 is a partial sectional view of the electromagnetically controlled spring clutch mechanism of FIG. 1 when the electromagnetic means is energized.

On the other hand, when the electromagnetic means 20 in the above state is then energized, it magnetically attracts the armature 18 against the elastic biasing action of the elastic biasing spring member 68. As a result, as shown in FIG. 3, the armature 18 moves to the left in FIG. 1 away from the rotation control member 46 and its other surface abuts against the annular flange 86a of the bobbin 80 in the electromagnetic means 20. Consequently, the first pawl member 67 of the armature 18 is disengaged from the second pawl member 56 of the rotation control member 46, and the rotation control member 46 becomes free to rotate. When the rotation control member 4 becomes free to rotate, the coil spring means 44 is contracted by friction generated between it and the first boss member 32 rotating as a unit with the gear 16 rotating in the direction of arrow 34. As a result, the first boss member 32 is connected to the boss portion 38 of the second boss member 36 via the coil spring means 44, and the supporting shaft 6 is drivingly connected to the gear 16 via the pin member 42, the second boss member 36, the coil spring member 44 and the first boss member 32, and the rotating driving force of the gear 16 is transmitted to the supporting shaft 6. At this time, the rotation control member 46 is rotated together with the supporting shaft 6 and the second boss member 36.

Accordingly, in the spring clutch mechanism 10 in the illustrated embodiment, when the first pawl member 67 on the armature 18 is engagement with the second pawl member 56 on the rotation control member 46, the contraction of the coil spring means 44 is restrained and the driving force is not transmitted. On the other hand, when the engagement between the first pawl member 67 and the second pawl member 56 is cancelled, the coil spring means 44 is contracted to transmit the driving force to the shaft 6. Accordingly, the supporting shaft constructing the output rotating element can be rotated by a predetermined amount in relation to the distance between the second pawl members 56, and also to the distance between first pawl members 67 (if two or more of them are provided).

Since the clutch mechanism 10 itself has the first pawl member 67 and the second pawl member 56 therein, it does not require a relatively large installation space.

While the present invention has been described with reference to one embodiment of the electromagnetically controlled spring clutch mechanism constructed in accordance with this invention, it should be understood that the invention is not limited to this specific embodiment and various changes and modifications are possible without departing from the scope of the invention.

For example, in the illustrated embodiment, the supporting shaft 6 is rotated by substantially 90 degrees (for example, 90, 180, 270 degrees . . . ) by providing one first pawl member 67 in the armature 18 and four second pawl members 56 in the rotation control member 46. But this is not limitative, and for example, by changing the number of the second pawl members 56, the shaft 6 can be rotated by a desired angle. For example, when it is desired to rotate the supporting shaft 6 substantially by 180 degree (or 120 degree), two (or three) second pawl members 56 may be provided at equal intervals on the annular flange portion 50 of the rotation control member 46.

Figure 4:
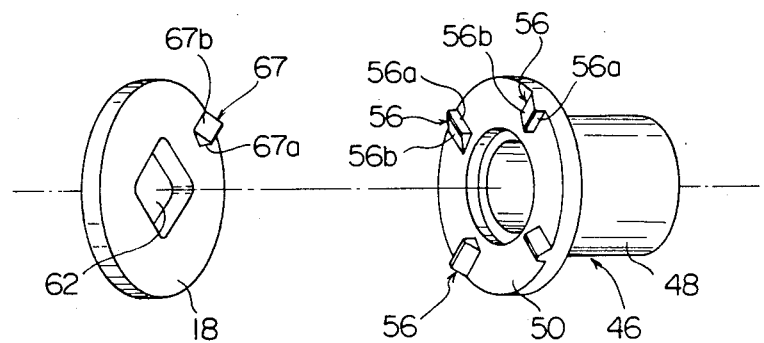
FIG. 4 is a perspective view showing modified examples of the armature and the rotation control member in the electromagnetically controlled spring clutch mechanism of FIG. 1.

The first pawl member 67 and the second pawl members 56 are preferably in the shapes shown in FIG. 4. Specifically, in the first pawl member 67 provided in the armature 18, the surface 67a which abuts against the second pawl member 56 extends substantially vertically from the aforesaid one surface of the armature 18 toward the rotation control member 46, and the surface 67b which faces the second pawl member 56 is inclined in a direction away from the rotation control member 46 from the surface 67a toward the other side. In each of the second pawl members 56 provided in the annular flange portion 50 of the rotation control member 46, the surface 56a which abuts against the surface 67a of the first pawl member 67 extends substantially vertically from the facing surface of the annular flange 50, and the surface 56b facing the first pawl member 67 is inclined in a direction away from the armature 18 from the side of the surface 56a toward the other side. By the construction, the first pawl member 67 and the second pawl member 56 are engaged with each other smoothly.

In the illustrated embodiment, the first pawl member 67 is provided in the armature 18, and the second pawl member 56, in the rotation control member 46. The first pawl member 67 and the second pawl members 56 are not essential. When these pawl members are absent, the aforesaid one surface of the armature 18 make direct contact with that surface of the annular flange portion 50 of the rotation control member 46 which faces the armature 18. Hence, when the electromagnetic means 20 is deenergized, the armature 18 is pressed against the annular flange portion 50 of the rotation control member 46 by the action of the elastic biasing spring member 68 and connected to the rotation control member 46. As a result, the rotation of the rotation control member 46 is hampered and the contraction of the coil spring means 44 is hampered (the rotating force of the gear 16 is not transmitted to the supporting shaft 6). On the other hand, when the electromagnetic means 20 is energized, the action of the electromagnetic means 20 causes the armature 18 to be magnetically attracted in a direction away from the rotation control member 46, and the connection between the armature 18 and the annular flange portion 50 of the rotation control member 46 is cancelled. As a result, the rotation control member 46 becomes free to rotates and the coil spring means 44 is contracted (the rotating force of the gear 16 is transmitted to the supporting shaft 6). In order to avoid slippage between the armature 18 and the rotation control member 46 at the time of deenergization of the electromagnetic means 20, it is preferred to provide a friction member formed of a material having a high coefficient of friction in at least one of the aforesaid one surface of the armature 18 and that surface of the annular flange portion 50 which faces the aforesaid one surface of the armature 18.

What is claimed is:

1. An electromagnetically controlled spring clutch mechanism comprising an output rotating element mounted rotatably, an input rotating element mounted on the output rotating element for free rotation relative to the output rotating element, a first boss member adapted to rotate as a unit with the input rotating element, a second boss member provided adjacent to the first boss member and adapted to rotate as a unit with the output rotating element, a coil spring means fitted over and across the first and second boss members and drivingly connected said two boss members by its contraction, a rotation control member for hampering the contraction of the coil spring means, an armature mounted in proximity to the rotation control member for free rotation axially of the output rotating element, a biasing means for biasing the armature in a direction in which the armature approaches the rotation control member, and an electromagnetic means for magnetically attracting the armature away from the rotation control member against the biasing action of the biasing means; wherein when the electromagnetic means is deenergized, the armature is biased toward the rotation control member by the action of the biasing means and the rotation of the rotation control member is hampered whereby the contraction of the coil spring means is hampered, and when the electromagnetic means is energized, the armature is magnetically attracted in a direction away from the rotation control member by the action of the electromagnetic means and the rotation control member is free to rotate whereby the coil spring means is contracted, said electromagnetic means including a cylindrical field and a coil assembly, said field including an outside wall and having one open end surface, a coil assembly comprising a bobbin and a coil wound on the bobbin, said coil assembly being mounted within the field, said coil having a connecting wire portion, a protective member fitted to the connected wire portion of the coil, a mounting opening formed in the field and extending to said open end surface of the field, said protective member being mounted in the mounting opening from said open end surface, said field having shoulder portions extending in the mounting direction of the protective member, said shoulder portions being formed at positions of the field which define the mounting opening, said protective member having a main body portion and engaging portions, said main body portion projecting outwardly through the mounting opening and outwardly of the outside wall of the field, said engaging portions being engaged with the shoulder portions, said bobbin having a sleeve portion and flange portions, said coil being wound on said sleeve portion, said flange portions being provided at both ends of the sleeve portion, one of said flange portions being positioned at said open end surface of the field and being provided with a position setting protrusion, said position setting protrusion being positioned in the shoulder portions in the field.

2. The clutch mechanism of claim 1 wherein a first pawl member projecting in the axial direction of the output rotating element is provided in one surface of the armature and a second pawl member projecting toward said one surface of the armature in the axial direction of the output rotating element and being engageable with the first pawl member is provided in that surface of the rotation control member which faces said one surface of the armature, and when the electromagnetic means is deenergized, the armature is biased toward the rotation control member by the action of the biasing means to effect engagement between the first pawl member of the armature and the second pawl member of the rotation control means whereby the rotation of the rotation control member is hampered; and when the electromagnetic means is energized, the armature is attracted magnetically in a direction away from the rotation control member by the action of the electromagnetic means to disengage the first pawl member from the second pawl member whereby the rotation control member becomes free to rotate.

3. The clutch mechanism of claim 2 wherein the rotation control member has a hollow sleeve portion and an annular flange portion provided in the sleeve portion, the sleeve portion is rotatably mounted over the coil spring means, the second pawl member is provided on that surface of the flange portion which faces said one surface of the armature, and the coil spring means is connected at one end to the rotation control member and at the other end to the second boss member and coils from said one end to said other end in a direction in which it is contracted when the rotation control member is rotated incident to the rotation of the input rotating element in a predetermined direction.

4. The clutch mechanism of claim 1 wherein the armature is constructed such that it has one surface adapted to be pressed against that surface of the rotation control member which faces said one surface of the armature, and when the electromagnetic means is deenergized, the armature is pressed against the rotation control member by the action of the biasing means to be connected to the rotation control member whereby the rotation of the rotation control member is hampered, and when the electromagnetic means is energized, the armature is magnetically attracted by the action of the electromagnetic means in a direction away from the rotation control member to cancel the connection between the armature and the rotation control member whereby the rotation control member becomes free to rotate.

5. The clutch mechanism of claim 1 wherein the electromagnetic means and the rotation control member are disposed on opposite sides of the armature, the biasing means is constructed of an elastic biasing spring member interposed between the electromagnetic means and the armature, and the elastic biasing spring member elastically biases the armature in a direction in which the armature approaches the rotation control member.

* * * * *